United States Patent [19]

Förtsch et al.

[11] 4,442,154

[45] Apr. 10, 1984

[54] LONGITUDINALLY SPLIT SLEEVE

[75] Inventors: Johann Förtsch, Kronach-Friesen; Hans-Jürgen Meltsch, Germering, both of Fed. Rep. of Germany

[73] Assignee: Siemens Aktiengesellschaft, Berlin and Munich, Fed. Rep. of Germany

[21] Appl. No.: 413,749

[22] Filed: Sep. 1, 1982

[30] Foreign Application Priority Data

Sep. 9, 1981 [DE] Fed. Rep. of Germany ....... 3135766

[51] Int. Cl.³ .......................... B32B 3/06; F16L 9/00; F16L 33/00; H02G 13/06
[52] U.S. Cl. ...................................... 428/99; 138/156; 138/166; 138/167; 138/168; 174/92; 174/DIG. 8; 24/19; 24/20 R; 24/20 EE; 24/33 R; 428/36; 428/100
[58] Field of Search ................... 428/99, 100; 138/156, 138/166, 167, 168; 174/92, DIG. 8; 24/19, 20 R, 20 EE, 33 R

[56] References Cited

U.S. PATENT DOCUMENTS

| 3,379,218 | 4/1968 | Conde | 174/DIG. 8 |
| 4,241,119 | 12/1980 | Smart | 174/DIG. 8 |
| 4,252,849 | 2/1981 | Nishimura et al. | 138/156 |
| 4,268,559 | 5/1981 | Smuckler | 138/156 |
| 4,371,578 | 2/1983 | Thompson | 174/DIG. 8 |
| 4,396,656 | 8/1983 | Still et al. | 174/92 |
| 4,399,840 | 8/1983 | Lee | 138/156 |

FOREIGN PATENT DOCUMENTS

| 1947057 | 3/1970 | Fed. Rep. of Germany . |
| 54159722 | 12/1979 | Japan . |
| 1503328 | 3/1978 | United Kingdom . |

Primary Examiner—William R. Dixon, Jr.

[57] ABSTRACT

A split sleeve of a shrinkable material having closure elements comprising projections and apertures for receiving the projections adjacent each edge characterized by the projections being integral tabs which are cut out from a portion of the sleeve and folded along the line inclined to the edge of the sleeve. To improve the stiffness of the longitudinal edges, reinforcing members may be partially embedded adjacent each edge with the closure elements formed therein or entirely embedded in the material of the sleeve member with the enclosure elements formed therein.

38 Claims, 41 Drawing Figures

LONGITUDINALLY SPLIT SLEEVE

BACKGROUND OF THE INVENTION

The present invention is directed to a longitudinal split sleeve having a strip-like sleeve member composed of a thermo-plastic synthetic member having a shape memory. The sleeve member has longitudinal edges and closure means for closing the edges together so that the edges can be sealed together after the sleeve has been wrapped around an object and the sleeve is shrinkable onto the enclosed object when heat is applied. The closure arrangement includes a plurality of radially extending elements along one edge of the sleeve member which are received in apertures disposed in space relationship along the other edge and at least one of the two edges is provided with a reinforcing member or reinforcement.

A longitudinally split sleeve which consists of a thermo-plastic synthetic material which is capable of a shape memory is discussed in copending U.S. patent application Ser. No. 313,342 filed Oct. 20, 1981, which was based on German patent application No. P30 48 051.4 and the disclosure of this application is incorporated by reference thereto. As disclosed in this application, the sleeve is closed by having its longitudinal edges arranged in overlapping relationship and each longitudinal edge is provided with a closing element which will mutually engage one another. These closing elements are designed as hook elements provided in one reinforcing member secured to one edge of the sleeve and apertures formed in the other reinforcing member secured to the other edge of the sleeve member. The reinforcing elements or members are more thermally stable than the material of the sleeve and therefore hardly change during the shrinking operation. However, the manufacture of this split sleeve to attach the separate closing elements requires a manufacturing process, which must utilize a plurality of steps.

A heat shrinkable, split sleeve consisting of a synthetic which exhibits a closing means consisting of two parts loosely engaged in one another is disclosed in German OS No. 2652014. One part of the closing device consists of metal fingers which are formed to engage the other part and prevent a disengagement of the two edges. The sleeve however, has the disadvantage that the projecting metal fingers will be deformed as a result of the radially influencing shrinking forces and finally release one another when no additional measures are undertaken.

SUMMARY OF THE INVENTION

The present invention is directed to creating a longitudinally split sleeve composed of a thermo-plastic synthetic member having a shape memory which sleeve is designed in such a manner that along its longitudinal edges, additional assembly parts are not required for closing the sleeve about an object such as a cable.

These objects are achieved by an improvement in a longitudinally divided or split sleeve having a strip-like sleeve member composed of a thermo-plastic synthetic member having a shape memory, said sleeve member having longitudinal edges, said sleeve having closure means for closing said edges together in an overlapping joint so that the edges can be sealed together after the cable sleeve has been wrapped around the object, such as a cable, and the sleeve is shrinkable onto the enclosed object when heat is applied. The split sleeve includes at least one of the edges having a longitudinal reinforcing member or element and the closure means include the one edge having radially extending closure elements spaced therealong while the other edge has apertures for receiving the members to form the joint. The improvement comprises the radially extending closure elements being integral radially extending tabs formed from the material adjacent said one edge, said tab being cut from the material and being folded on a fold line which is at an angle inclined to the edge of the sleeve member. The angle can be either an oblique angle or a right angle and the cutting of the tab may be in the sleeve member through an embedded reinforcing element or in an exposed portion of the reinforcing element which is not covered by the material of the sleeve member. The cutting is basically on three sides so that the resulting tab or element can then be bent on the fold line. However, the shape and direction of the cuts can be arranged so that the tab may be composed of more than one portion which are interconnected together by fold lines and these members may have slanting edges to form the detents and/or hook portions for locking the tab in the aperture of the other coacting element of the closure means.

Significant advantages of the invention are that the longitudinally split sleeve can be seen wherein the closing elements along the parting line are formed from the material of the sleeve by means of corresponding cutouts which are then raised or bent out of the plane of the member as a tab. The synthetic material, which exhibits a shape memory and is therefore shrinkable when a heat is applied, preferably contains a reinforcing element which is embedded along its longitudinal edges by means of which these closing elements receive the necessary stiffness. The required stiffness for the closing elements themselves is achieved by means of stamping out of the tab section and folding these sections to extend from the surface with the fold line either being at right angles or at oblique angles to the edge. These opened out closing elements or tabs are inserted in apertures in the other longitudinal edge which preferably is also provided with reinforcing element or member and thus, additional closing elements are no longer required.

The shaping of the closing element or tab makes it possible that the corresponding closing element lying opposite one another can be easily found during the closing operation and hooked into one another. As a result of the reinforcing member embedded within the sleeve material, the stamped out tabs are also surrounded on both sides by a synthetic material of the sleeve so that this layer provides an additional shape stability. As a result of the slight width of the opened out tab, an easy engagement into the aperture forming the coacting closing element on the other edge is possible. The latching is also possible as a result of the corresponding design and matching of the dimensions so that the bursting-open during assembly will be prevented. The oblong design of the full cutout allows a longitudinal compensation for longitudinal displacement of the two edges. Disposed below these longitudinal edges, the sleeve member is provided with a flap, which will extend across the joint between the two edges and acts as a longitudinal seal in the particular area of the joint. Excellent flexibility in the longitudinal direction is obtained by means of the structure of the closing element so the assembly of the split sleeve on an object such as a cable is easily obtained. The closing elements or tabs are expediently folded out of plane of the sleeve member in such a manner that so to speak, an undercut or notch occurs so that the coacting elements do not become disengaged due to the forces created during the shrinking operation. During the shrinking operation, the hook portion of the tab hooks into the edge of the apertures more and more tightly.

In addition, the closing elements which were formed by the spaced apertures in the other longitudinal edge are designed as complete cutouts which will improve the thermal conduction to the closing area which is covered by the flap. As a result, a sealing material, for example a melted adhesive, which is introduced in the area of the joint will be activated more easily and with more uniformity. In addition, the length of the sleeve can be easily extended in an axial direction as needed by interconnecting two sleeves together. The last closing tabs on the first sleeve are simply folded down and the first tab of the second sleeve is engaged into the apertures of the first sleeve. In addition, the tabs that are formed as in the closing elements can be mechanically stiffened by means of multiple folding and/or by means of bending back the tab. An appropriate U-shaped closing element, which can be respectively engaged into a full cutout of the second longitudinal edge, can then be produced by means of bending back a tab which has several portions connected by fold lines. The closing elements can be stiffened and protected against influences during storage, transport or during mounting by means of employing retaining clips, rivets or the like which can be applied over the opened up closing element.

As already mentioned, particular advantages are derived in the closing elements or tabs which are designed as catch elements which are received in the apertures before the shrinking operation occurs. These mutual latchings can be further promoted by providing a projection or a single longitudinal projection or flap in the closing area and this for example is designed as a resilient abutment for the other edge. The embedded reinforcing element or member in the edges are designed as flexibly as possible by means of performations, notches or apertures so that the closing area remains as adaptive as possible. The incorporation of the reinforcing elements into the material of the sleeve member results in the coating in a certain sense of the closing elements or tab which simultaneously produces a protection against corrosion. By utilizing corrosion proof material for the reinforcing elements, these can also be disposed to project along the longitudinal edges from the material of the sleeve member and into the closing area so that closing elements, such as the tabs are formed by means of cutting the uncoated or unembedded portions of the reinforcing elements. The technical execution of this closing element however is retained. What is therefore again important is that the bending of the tab at a substantially right angle to the plane of the member along a fold line that is inclined to the edge of the sleeve improves the buckling strength of the particular element or tab.

BRIEF DESCRIPTION OF THE DRAWINGS

FIG. 29b is a front view of the element of FIG. 29a.

DESCRIPTION OF THE PREFERRED EMBODIMENT

Figure 1:
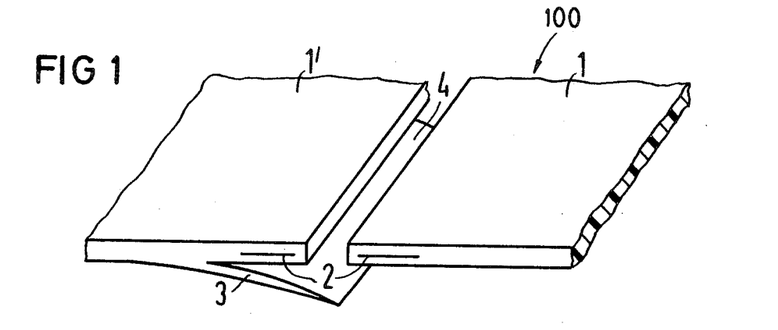
FIG. 1 is a perspective view of the edges of the sleeve member according to the present invention before the formation of the closing elements.
Figure 2:
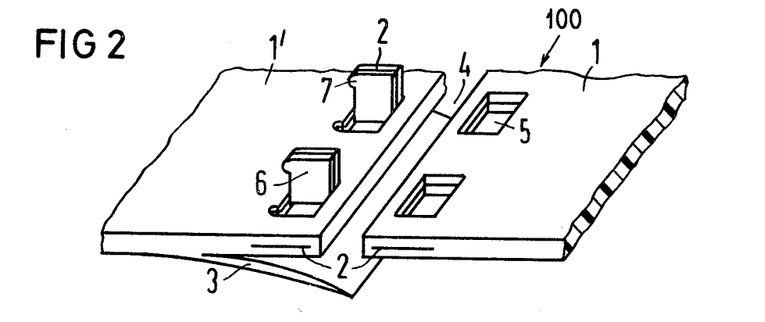
FIG. 2 is a perspective view of the sleeve of FIG. 1 with the closing elements formed therein.
Figure 3:
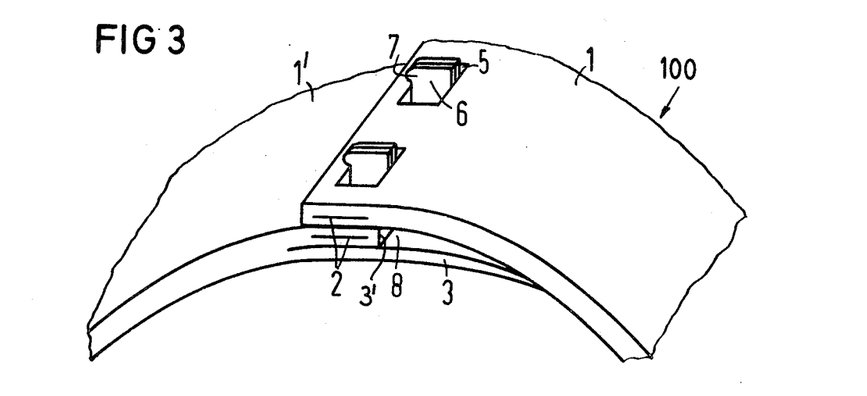
FIG. 3 illustrates the assembly of the edges of the sleeve of FIG. 2.

The principles of the present invention are particularly used when incorporated in a longitudinal split sleeve, such as a cable sleeve, generally indicated at 100 and partially illustrated in FIGS. 1, 2 and 3. As illustrated, the sleeve 100 has edge portions 1 and 1', which enable the sleeve 100 to be wrapped around an object, for example a cable to encapsulate the cable. The edge portions 1 and 1' define a split or parting line 4 for the sleeve 100 so that the sleeve 100 can be wrapped around an uncut elongated object. To close the sleeve, corresponding closure means for closing the two edge portions 1 and 1' are required. The closure means are formed by closure elements, which are provided along the two longitudinal edge portions 1 and 1', which are each illustrated as containing a reinforcing element or member 2. The use of the reinforcing elements are particularly necessary and desirable when the thermo-plastic for the sleeve 100 is provided which has a shape memory. The shape memory is designed in such a manner that the sleeve will constrict under the influence of heat so that it will press against the object which is being enveloped or enclosed.

Since upon heating, the edge areas will soften, the reinforcing elements 2 for the mechanical stability are necessary because the increasing tangentially directed shrinkage forces would effectively pull the closure areas apart. As illustrated in FIGS. 1, 2 and 3, the sleeve 100 adjacent one of the edge portions such as 1' is provided with a flap 3 which will project beyond the edge portion and thus overlap a joint which is formed when the two edge portions are overlapped in the assembled position as illustrated in FIG. 3. This flap 3, as illustrated in FIG. 3, will form a cavity 8, which will be discussed hereinafter. The sleeve 100 is illustrated in FIG. 1 in a raw state without the closure means being formed therein.

The design of the closure means comprises closure elements 6, which are formed by surface cuts into the material of the sleeve adjacent the edge 1' which cut portions are stamped or cut into the material along essentially three sides and the material enclosed in the three sides is then raised or folded out of the plane of the sheet to form a radially extending closure element or tab 6. Since these cuts are formed in the portion adjacent to the edge which portion has the reinforcing element 2 embedded therein, each of the raised portions or tabs 6 will also include a portion of the reinforcing element 2 with the material of the sleeve 100 on each side thereof. As illustrated, the elements 6 are folded along a fold line best illustrated in FIG. 9, which extends at right angles to the edge of the edge portion 1. Thus the element 6 has its major dimensions extending in the direction of the forces applied due to the tangentially directed shrinkage forces and as a result has the necessary stiffness for even a relatively thin element which stiffness will withstand the shrinkage forces. As illustrated, each closure element or tab 6 consists of three layers namely the two outer layers consisting of thermo-plastic material of the sleeve and the layer reinforcing the element 2 which produces the required stiffness being disposed or sandwiched therebetween.

After placement around the object of the envelope, the upstanding tabs 6 that are pointing radially outward are now inserted in the closure elements in the other edge portion 1 which are illustrated as cutout apertures 5. As illustrated these apertures are positioned in the portion of the edge 1 which has embedded a reinforcing element 2 embedded therein and the aperture 5 has such a size that closure element or tab 6 can be introduced with a snug fit. So that the unintentional release of the preassembled sleeve cannot occur during the shrinking process, it is desirable that the closing element 6 be provided with latch means for example, a projecting knob 7 which requires pressure to insert the tab 6 into the aperture 5 and resist disassembly. As illustrated in FIG. 2, these knobs 7 are formed by the shape of one of the cut lines.

When the two edge portions 1 and 1' are assembled as illustrated in FIG. 3, the longitudinal edge 1 is placed in overlapping relationship on the longitudinal edge 1' and is mutually engaged therewith to form an overlapping joint with the closure elements 6 being inserted in the apertures or closure elements 5. As is illustrated, the radially extending elements 6 just barely project beyond the edge 1 with the projections or knobs 7 being above the surface of the edge to help retain each of the radially extending tabs 6 in there respective aperture 5. Such an arrangement will prevent the automatic release of the closure. In the assembled position, it is noted that the flap 3, which extends past the edge 3' engages an inner surface of the sleeve 100 and forms an elongated cavity 8. The cavity 8 may have its size and shape changed by the appropriate design of the longitudinal edges such as 1 and 1' for example, by having a layer configuration. A sealing material for example, a melting adhesive can be introduced in this area of the cavity 8 and a longitudinal seal of the parting line or joint will occur. It is also noted that the embedded reinforcing elements at each edge provide the required strengthening and stiffening. It is therefore important that the reinforcing elements 2 are heat resistant for example, that these reinforcing elements must retain their consistency when the material of the sleeve 100 softens during a shrinking operation so that the deformation in the area of the closure cannot occur. Certain length balancing or compensating for longitudinal offset between the two edges is achieved for the upstanding tabs forming the closure elements 6 which are made possible because of the length of the apertures forming the elements 5 so that during the assembly, the mutual hooking of the individual closing elements is facilitated.

Figure 4:
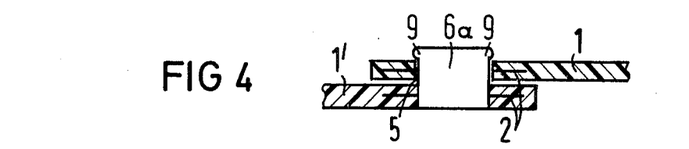
FIGS. 4–8 are schematic cross-sectional views illustrating different shapes for the upstanding connecting element or tab.

The upstanding tabs forming the elements 6 can have various shapes or configurations. For example, a rectangular upstanding tab forming a closure element 6a which has two nubs or knobs 9 at its upper lateral edge to form the latch means. Because the height of the upstanding tab 6a approximately corresponds to the thickness of the sleeve or longitudinal edge 1, the latch effect of such knobs 9 are obvious. Thus the closure element formed by the aperture 5 has a dimension, which approximately corresponds to the upstanding tab forming the element 6a, which is relatively firmly tightly inserted in the aperture. On the other hand, the knobs 9 are seated above the thickness of the edge 1 in the assembled state and project beyond the width of the aperture 5 and as a result of a certain elasticity of the material, it is possible to press them through and finally a snap fit becomes possible.

Figure 5:
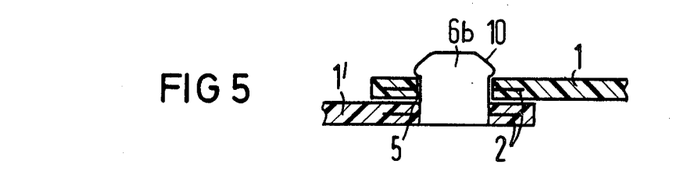

To facilitate inserting each of the latch elements, the upper projections or knobs can be formed as illustrated by the knobs 10 of FIG. 5 for the element 6b. The slanting upper surface has the advantage that during assembly of the tab 6b into aperture 5, the slanting surfaces will aid in centering the tab and also its insertion.

Figure 6:
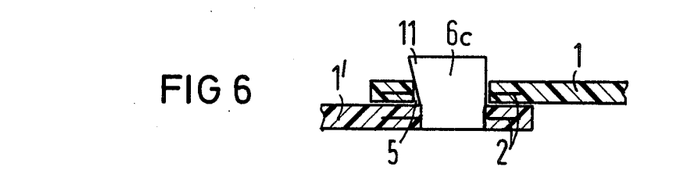
Figure 7:
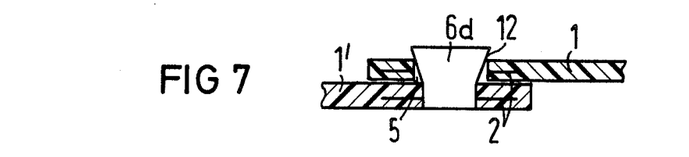

Another possible embodiment for the upstanding tab is illustrated by the element 6c in FIG. 6. In this arrangement, the cut surfaces are such that the width of the tab 6c increases as the distance from the fold line in the edge 1' increases. This expected increase is on one side and forms a hook or expansion 11 which will prevent unintentional release of the tab 6c from an aperture 5 during the shrinking operation. Another example of the increasing width is illustrated in FIG. 7 by the element 6d, which is cut with oppositely extending expansions or projections 12 disposed on both sides of the element. Thus a trapezoidal shape is created for the tab 6d.

Figure 8:
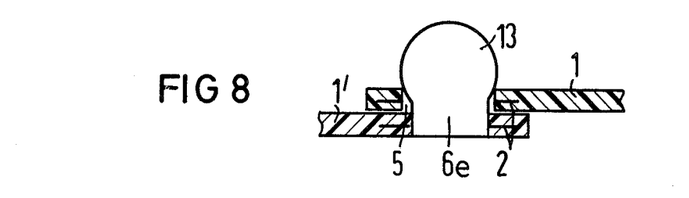

A final embodiment of providing latch means for the tab is to cut the tab so it has a primarily circular configuration such as the tab 13 that forms a support the element 6e. The arc of the cut out surface 13 is selected so that it can be pushed through the closure element 5 and forms grooves adjacent the fold line of the edge portion 1' to receive the edges of the aperture 5. It should be noted that the above mentioned fundamental shapes can be better matched to one another in a suitable manner by means of rounding the confirmation.

Figure 9:
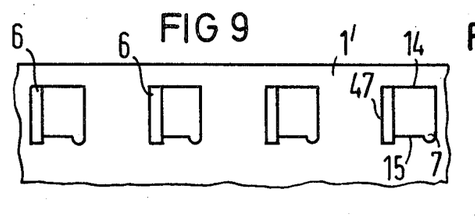
FIG. 9 is a plan view of connecting elements such as illustrated in FIG. 1 with FIG. 9a being a rear view of the connecting element and FIG. 9b being an end view.
Figure 9A:
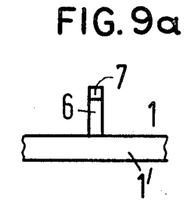
Figure 9B:
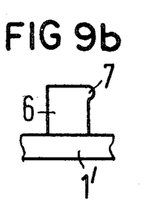

The folded out tabs forming the closure elements along the longitudinal edge 1' are illustrated in a plan view in FIGS. 9–13. As illustrated, the element 6 in FIG. 9 is produced by means of two parallel cuts 14 and 15 and a interconnecting cut with the interconnecting cut and the cut 15 forming the knob 7. After the cuts have been formed, the tab is folded out along the fold line 47, which as illustrated in FIG. 9 extend at right angles to the cut edges 14 and 15 and to the edge of the edge portion 1'. Thus the tab 6, which forms a closure element is placed at right angles relative to the edge of the longitudinal edge portion 1'.

Figure 10:
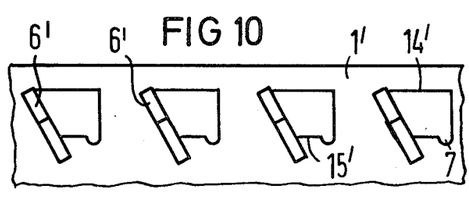
FIG. 10 is a plan view of another arrangement of connecting elements according to the present invention with FIG. 10a being a rear view and FIG. 10b being an end view.
Figure 10A:
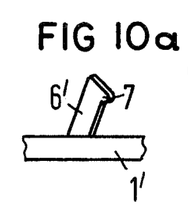
Figure 10B:
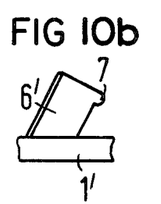

Upstanding elements 6' of FIG. 10 are substantially similar to the elements 6 of FIG. 9 however, cut 15' is shorter than cut 14' so that when the tab is folded out to form the element 6', the bend or fold line will extend obliquely relative to the edges of the cuts and to the edge of the edge portion 1. As a result, a slanting position of the upstanding tab forming the closure element 6' will be obtained and result in a element 6' which has an undercut hook (see FIGS. 10a and 10b). Given the influence of the shrinkage forces, which are oppositely directed in the circumferential direction in the closing area, the closing element 6' will become mutually engaged more tightly with the edges of the aperture 5 during the shrinking process so that an automatic release during this operation is impossible.

Figure 11:
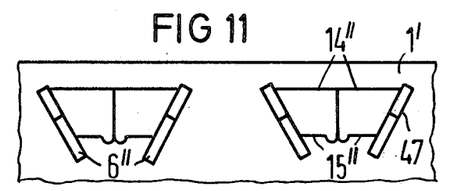
FIG. 11 is a plan view of yet another arrangement of connecting elements according to the present invention with FIG. 11a being a rear view and FIG. 11b being an end view thereof.
Figure 11A:
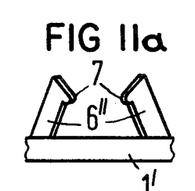
Figure 11B:
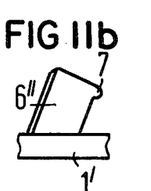

Another embodiment of the tabs is illustrated by the element 6'' in FIG. 11. Here, the three cut lines form 2 elements since the two parallel extending cuts 14'' and 15'' are divided by a transverse cut and two tabs open out opposite to each other to form the pair of elements 6''. The two tabs can be produced in one cutout or punching operation. Depending upon the length of the two parallel lines 14'' and 15'' relative to each other, the fold lines can be either oblique to the edge or can be at right angles. Depending on the nature of the fold lines, the elements 6'' then project perpendicularly from the surface and are either perpendicular to the edge or oblique to the edge. When they are oblique to the edge as in the embodiment of the tab 6', they form a hook like arrangement for engaging the edge of the aperture when assembled (see FIGS. 11a and 11b). As illustrated, the two tabs 6'' also slant toward each other.

Figure 12:
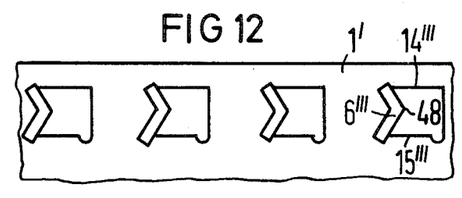
FIG. 12 is a plan view of a still further embodiment of a connecting element in accordance to the present invention with FIG. 12a being a rear view and FIG. 12b being an end view.
Figure 12A:
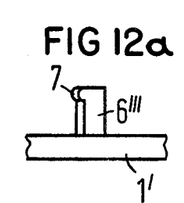
Figure 12B:
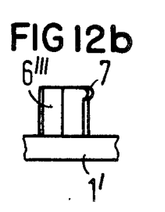

It is desirable to increase the rigidity of each of the elements 6 by providing a strengthening fold such as a fold 48 that is provided in the element 6''' of FIG. 12. Here the fold line 48 is substantially perpendicular to direction of the shrinkage force. Thus, additional stiffening of the closure element 6''' is obtained. This additionally already described angling can be created by means of cuts 14''' and 15''' which can be produced with reliability. In addition, the shape of tab 6''' can also be executed as a double fold out which can be seen from FIGS. 12a and 12b.

Figure 13:
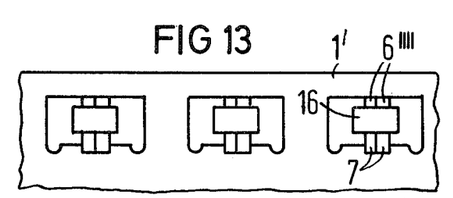
FIG. 13 is a plan view of a still further arrangement of the connecting elements of the present invention with FIG. 13a being a rear view and FIG. 13b being an end view.
Figure 13A:
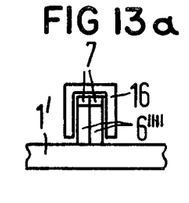
Figure 13B:
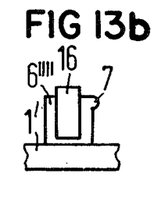

In another variation of the closure elements, two tabs are folded out as a pair. This is carried out so that the fold lines for the two tabs are adjacent to each other and the elements such as 6'''' press against each other when folded. As illustrated in FIG. 13, each of these tabs is provided with a projection or knob 7 to act as latch means and were folded out in different directions. For an additional safeguard, a retaining element such as 16 in the form of a clamp or a rivet or some similar element can be provided to pull the two elements 6'''' together. These retaining elements 16 protect the outwardly directed closure elements and produce additional stability. Likewise, bending or flanging of the free ends of the closure elements produces an additional safeguarding of the closure elements. This flanging or bending can be carried out as a single as well as a double fold out and provides an arrangement in which the exposed edges of the reinforcing member 2 are protected since they are no longer exposed as a result of the flanging.

Figure 14:
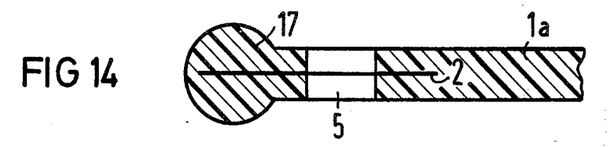
FIGS. 14–18 are schematic cross-sectional views showing different arrangements for reinforcing members in one of the edges which edge has the apertures for forming a portion of the connecting elements.
Figure 15:
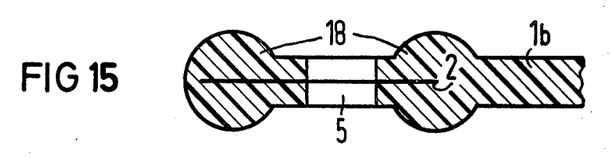

The second longitudinal edge portion 1 in which the elements 5 are formed by cutting out apertures therethrough can have different configurations. For example, as illustrated in the cross-sectional view of FIG. 14, the aperture 5 forming the closure element in an edge portion 1a extends through an embedded reinforcing element or member 2. The edge portion 1a is terminated at its outer edge by a bead 17 so as to give additional protection and additional stabilization. The bead 17, as in the following examples, can also be designed to extend only from a single side or surface of the edge portion 1a instead of from both surfaces as illustrated. The bead 17 can also be continuously molded as a swelling or thickening of the longitudinal edge portion 1a. It is also advantageous when the beads 17 are present in the area of the closure elements since a continuous transition with good protection of the edges can be achieved. As illustrated in FIG. 15, the closure element formed by an aperture 5 in the longitudinal edge portion 1b extends between a pair of beads 18. In this arrrangement, among other things, the closure element on the first mentioned edge portion will not extend or project above the two beads 18 and will be protected. The transition as well as the set off of the beads 18 are also designed to conform.

Figure 16:
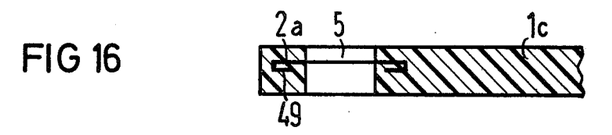

In all the previous embodiments, the reinforing elements such as 2 were flat strip-like members. However, the tape shaped or strip shaped reinforcing members can be provided with additional stiffening by having a longitudinally extending fold 49 on at least one edge. Preferably as illustrated by the member 2a for the edge 1c of FIG. 16, both edges have folds 49.

Figure 17:
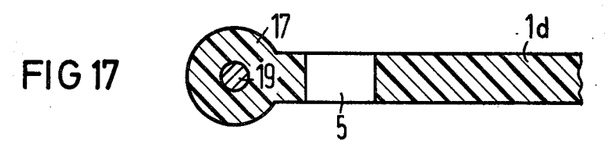

Instead of utilizing the strip shaped member such as 2 or 2a as a reinforcing element, a wire shaped reinforcing element 19 can be embedded in a bead 17 which extends on the edge of the portion 1d (FIG. 17). Thus the edge of the longitudinal portion 1d is likewise protected against deformation during the shrinkage operation. The closure elements are designed as apertures which are positioned behind the bead 17 when viewed from the edge. Thus the point of attack of the effective shrinkage forces will lie behind the reinforcement 19 as a result of the engagement of the tabs on the other edge portion.

Figure 18:
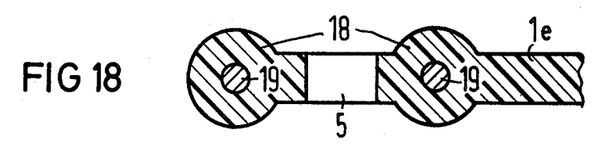

Another embodiment of reinforcing elements is illustrated by the edge portion 1e of FIG. 18 which has a pair of beads 18 each of which receive a wire reinforcing element 19. The closure elements formed by an apertures 5 are disposed to lie between these parallel reinforcing elements and beads and the transition of beads are matched in a suitable manner.

Figure 19:
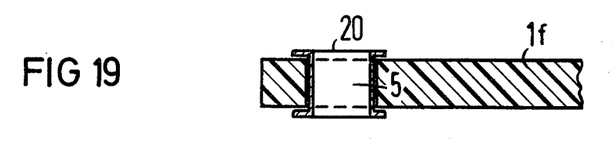
FIG. 19 is a schematic cross-sectional view of another embodiment of the reinforced aperture.

Another embodiment of the closure element in an edge 1f is illustrated in FIG. 19 wherein a full cutout or aperture of the closure element 5 is protected by a hollow eyelet 20. This hollow eyelet 20 embraces the edges and protects them against tearing or deforming. The hollow eyelet 20 is expediently designed in an elongated tape which exhibits hollow eyelet-like punch outs at intervals which depend on the spacing of the upstanding tabs forming the radially extending elements in the other edge. This tape is then put in place along the longitudinal edge 1f of FIG. 19 and the hollow eyelet-like punch outs are introduced into the apertures forming the elements 5 and then finally pinched or deformed. As a result, a reinforcement of a longitudinal edge as well as a reinforcement of the closure elements 5 is achieved.

In all of the embodiments illustrated in FIGS. 14–19, suitable sealing means such as for example a melting adhesive can be applied to an inwardly directed surface, for example, a surface facing the other longitudinal edge portion in order to achieve the longitudinal sealing of the parting line or joint between the overlapping edges. The reinforcements or members which are to be introduced into the longitudinal edges, are coated with a bonding agent for example a polyethylene copolymer (PEAC) so that an intimate connection between the reinforcement and the material of the sleeve is produced. It is also desirable that the areas of the longitudinal edges of the sleeve member, in which the closure elements are formed, have a different wall thickness from the remaining areas of the sleeve.

Figure 20:
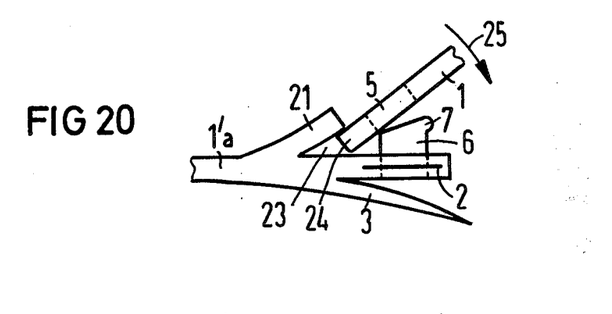
FIG. 20 is an end view schematically illustrating an embodiment of the connecting elements of the present invention.

To aid in closing the joint between the two edge portions, the sleeve member adjacent one of the edge portions, such as the portion 1'a, can be provided with a plurality of latch elements 21 (FIG. 20), which are formed on the outside surface of the portion 1' and extend parallel to the line of tabs forming the closing elements 6. These projections or elements 21 are designed as a resilient V-shaped or U-shaped lips, whose openings are opened towards the joint. By so arranging, a snap in space 23 is provided between the various upstanding closing elements 6 and the latch element 21. However, the latch element 21 can be designed as a single continuous longitudinal extending lip or projection so that it fixes the second longitudinal edge over its entire length. The snap in space 23 serves for receiving the edge 24 of the other edge portion 1 when the edges are brought together. During this closing operation, the edge 24 is introduced into the V-shaped snap-in groove 23 until the apertures 5 can be snapped over the upstanding tabs forming the element 6. The snap-in occurs by means of pulling the longitudinal edge 1 down in a direction of arrow 25 until finally the knobs 7 extend above the longitudinal edges 1. However, the edge 24 of the longitudinal edge portion 1 is also fixed by the latch element 21 and an unintentional opening due to unlatching of the edge 21 is no longer possible. In addition, the edge portion 1'a is provided with an inwardly extending flap 3, which as mentioned hereinabove overlies the overlapped joint between the two edge portions.

Figure 21:
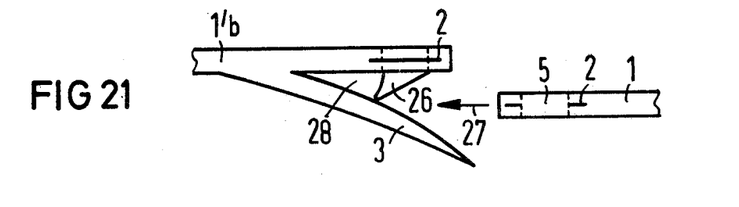
FIG. 21 is an end view illustrating another embodiment of connecting elements in accordance to the present invention.

In each of the previous embodiments, the upstanding tabs extended radially outward. However, the tabs can be bent to extend radially inward such as the tab 26 of edge portion 1'b in FIG. 21. Here the closure element 26 can take any of the previously mentioned shapes or configurations if modified due to the amount of space available. One of the advantages of the embodiment illustrated in FIG. 21 is that no closure element will appear on the outside of the sleeve. The design at the end of the element 26 is shown only schematically in FIG. 21 and the element is joined to one another as seamlessly as possible by means of rounding and mutual matching of the interconnecting elements. In principle however, it is seen that the second longitudinal edge or rim 1 with its apertures 5 is introduced for mutual engagement in a space 28 that extends between the longitudinal edge portion 1'b and the flap 3 by moving the edge portion 1 in a direction of arrow 27. A snap-in space formed by the space 28 is close to the element 26 and the edge of the second longitudinal edge portion 1 is accepted therein. Thus the edge is automatically protected and can no longer by disengaged since it is covered by the flap 3. By providing suitable sealing materials in the space 28, the sealing of the area of the joint is obtained. The tabs 26 moreover is also shaped in a hook like manner so that unintentional release of the closure is not possible.

Figure 22:
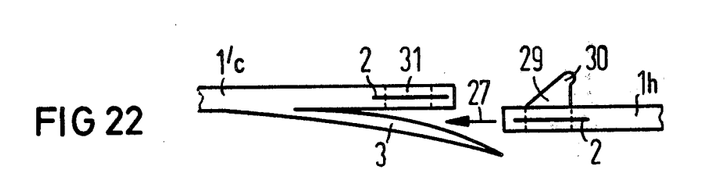
FIG. 22 is an end view of a still further embodiment of the connecting elements in accordance to the present invention.

In each of the previous embodiments, the apertures were all formed on the edge portion 1 while the projections were formed on the edge portion 1'. However, these relationships can be reversed as illustrated in FIG. 22. In this arrangement, an aperture 31 forms a closure element for an edge portion 1'c which also has the flap 3. The upstanding tabs or elements 29, which are folded to extend radially outward and have a latch element 30 are on the edge portion 1h. In this arrangement, it is possible that the longitudinal edge portion 1h can be introduced in the direction 27 between the flap 3 and the longitudinal edge portion 1' until the closure element 29 is received in the aperture 31. In this arrangement, only the latch element 30 will project beyond the surface of the sleeve member in the area of the joint. The undercut in the tab 29 is advantageous since an unlatching is rendered more difficult.

Figure 23:
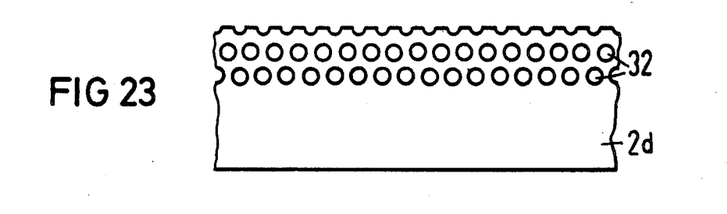
FIG. 23 is a plan view of an embodiment of a reinforcing element in accordance to the present invention.
Figure 24:
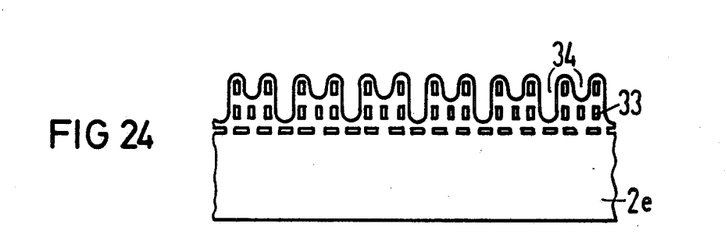
FIG. 24 is a plan view of another embodiment of a reinforcing element utilized in the present invention.
Figure 25:
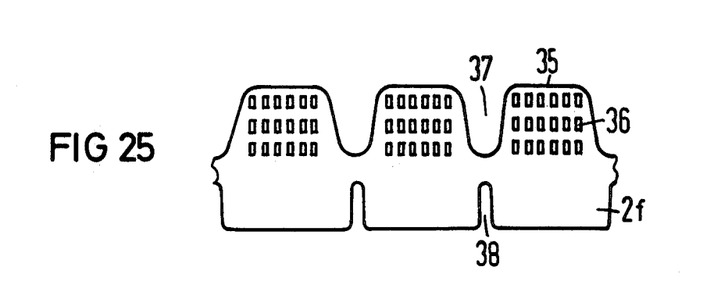
FIG. 25 is yet another embodiment of a reinforcing element in accordance to the present invention.

In the previous embodiments, the reinforcing elements 2 were described as being tape or strip like material which are embedded in each of the edge portions. The flexibility of the reinforcing element or member as well as its adhesion to the material forming the sleeve is of great consideration. The adhesion is achieved by means of coating the strip like reinforcing elements or members which usually consists of metal with a polyethylene copolymer (PEAC) and by means of suitable perforations or openings such as 32 in the member 2d (FIG. 23), 33 in member 2e (FIG. 24), or 36 in member 2f (FIG. 25). The coating of PEAC promotes the surface adhesion between the two materials and as a result of the penetration of the sleeve material into the perforations 32, 33, or 34 produces an increased adhesive effect since additional mutual connections between the layers of material separated by the reinforcing member is thereby formed. In order to additionally increase the flexibility of the reinforcing element 2e or 2f in a longitudinal direction, recesses or slots are punched out at suitable intervals so that the closing area becomes more flexible in a longitudinal direction and thus can be matched to the conditions particularly those during the shrinking operation. These slots can be slots of the configuration of slots 34 in member 2 (FIG. 24) or the slots 37 and 38 in member 2 and illustrated in FIG. 25. Moreover, the adhesion between the two materials is thereby improved since the sleeve material is brought together again in the area of the slots.

In each of the previous embodiments, the reinforcing elements were entirely embedded within the material of the sleeve. In the embodiment illustrated in FIGS. 26, 27, 28a and 28b a reinforcing element 39 is only partially embedded in the material of the edge 1m of the sleeve. The part of the reinforcing element, which projects beyond the longitudinal edge portion 1m also carries the closure element. In this embodiment, tab 50 with with four portions is formed by cut lines 40,40 in the element or member 39. However, the same type of cuts can also be undertaken with completely embedding of the reinforcing member and the previously described examples of upstanding elements can also be formed in the portion of the reinforcing member which is free of the sleeve material. However, complete embedding of the reinforcing elements is recommend particularly given easily corrodible materials since a surface protection can then be eliminated.

Figure 26:
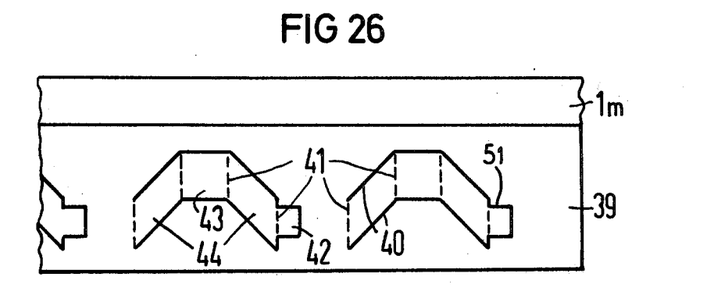
FIG. 26 is a diagrammatic plan view of an embodiment of the present invention with the connecting elements cut in an exposed portion of the reinforcing element.
Figure 27:
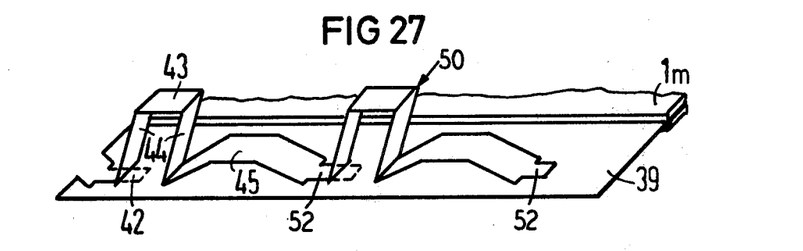
FIG. 27 is a perspective view of the embodiment of FIG. 26 with the connecting elements folded out of the plane of the reinforcing element.
Figure 28A:
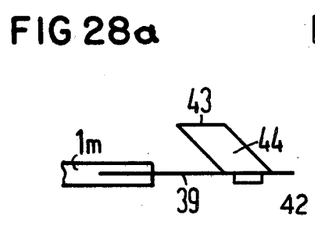
FIG. 28a is an end view of the connecting elements of FIG. 27.
Figure 28B:
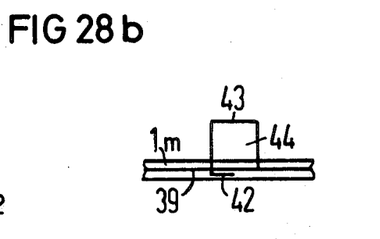
FIG. 28b is a front view of the connecting elements of FIG. 27.
Figure 29A:
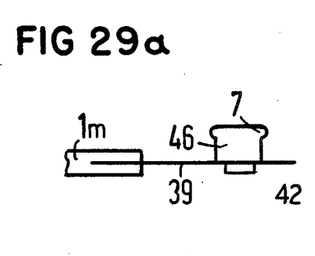
FIG. 29a is an end view of an embodiment of an element such as formed in FIG. 27.
Figure 29B:
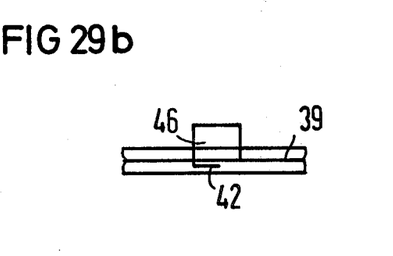

As illustrated in FIG. 26, the cuts 40 are guided in such a manner that two lateral portions or webs 44 are produced, whose edges are extending obliquely relative to the edges of the reinforcement member 39 and the two portions are interconnected by a rectangular designated center piece or cross piece 43. the cut edge of the center piece 43 extend parallel to the edge of the reinforcement 39. An additional portion 42 which is formed by cut 51 and after folding serves as a latching element extends from the end of one of the parallel portions 44. By folding portions of the tab along various fold lines 41 which are illustrated in broken lines, the tab 50, which is better illustrated in FIG. 27, will be created. As a result of the double fold a respective closure element or tab 50 has a U-shaped or box cross-section with the two lateral portions 44 and a center piece 43 connected therebetween. After raising the tab to the portion in FIG. 27 a cutout 45 occurs in the reinforcement member 39 and has a portion 52 which was covered by portion 42. A latching element such as portion 42 is inserted in portion 52 of the adjacent cutout 45. As can be seen, the result of the oblique cuts 40 gives the two portions 44 an angled surface as best illustrated in FIG. 28a. Thus an approximate undercut shaped element 50 will be created which will be more difficult to disengage when in the assembled state. As mentioned hereinabove, the portions 43 and 44 can be folded and have a box shape as illustrated in FIG. 28b and the latching element such as 42 after being folded under the reinforcing member 39 can be secured thereto if desired. If the portions such as 44 were formed by lines that extend parallel to the edge of the reinforcement element 39, then a box shape closure element 46 as illustrated in FIGS. 29a and 29b could be obtained. Latch means can be formed by knobs or projections 7, which are again formed due to shaping the cuts in the reinforcing element 39.

The closure elements themselves however can also be manufactured as single elements which are then only inserted when used into the holes or slots provided for this purpose in the sleeve which is being employed. This simplifies the manufacture of the sleeve in the closing area and assumed optimum matching of the closing conditions. These closure elements are likewise designed in accordance with all the described variations; however they then exhibit additional latching elements with which they are inserted and anchored in the closing areas.

In conclusion let it also be pointed out that a locking which prevents the tab from slipping through can be created by means of further folding of the tabs forming the closure elements while in their assembled state. In other words, after the tabs extend through the apertures of the adjacent edge portion, they are again folded to lock thereon. This additional folding can be employed as the only locking or as a locking in addition to the latch means already described.

Although various minor modifications may be suggested by those versed in the art, it should be understood that we wish to embody within the scope of the patent warranted hereon, all such modifications as reasonably and properly come within the scope of our contribution to the art.

We claim:

1. In a longitudinally split sleeve having a strip like sleeve member composed of a thermo-plastic synthetic member having a shape memory, said sleeve member having longitudinal edges with at least one edge having a reinforcing member, said sleeve having closure means for closing said edges together in an overlapping joint so that the edges can be sealed together after the sleeve has been wrapped around an object and the sleeve is shrunk onto the enclosed object by a result of an application of heat, said closure means comprising radially extending elements disposed along one edge of said sleeve member and being engaged in spaced apertures provided along the other edge of the joint, the improvements comprising said radially extending elements being integral radially extending tabs formed from the material adjacent said one edge, said tabs being cut from said material and being folded to the radially extending position along a fold line extending at an incline angle relative to the edge of the sleeve member.

2. In a longitudinal split sleeve according to claim 1, wherein each of the tabs has means forming a latch element for hooking the tab into the aperture of the adjacent edge.

3. In a longitudinally split sleeve according to claim 2, wherein each of the latched elements comprises a projecting knob on an edge of the tab.

4. In a longitudinally split sleeve according to claim 2, wherein each of the latch means comprises the radial extending tab expanding in width as the distance from the fold line increases.

5. In a longitudinally split sleeve according to claim 2, wherein the latch means comprises each of the radial extending tabs being cut with a radially extending projection to provide a undercut notch adjacent to the fold line.

6. In a longitudinally split sleeve according to claim 1, wherein each of the fold lines for the radially extending tabs extends on a line forming an oblique angle to the edge of the sleeve member.

7. In a longitudinally split sleeve according to claim 1, wherein the fold line comprises two portions extending an angle to each other and said radially extending tab has a radially extending reinforcing bend.

8. In a longitudinally split sleeve according to claim 1, wherein the radially extending elements are arranged in pairs for being received in the same aperture in the other edge of the sleeve member.

9. In a longitudinally split sleeve according to claim 1, wherein each edge of the sleeve member has a longitudinal extending reinforcing member embedded therein, and wherein each of the tabs comprises a portion of the reinforcing member with the synthetic material disposed on both surfaces thereof.

10. In a longitudinally split sleeve according to claim 1, wherein the reinforcing member comprises a longitudinally extending tape shaped member.

11. In a longitudinally split sleeve according to claim 10, wherein the reinforcing member has a plurality of perforations.

12. In a longitudinally split sleeve according to claim 10, wherein the reinforcing member has a plurality of notches disposed at intervals therealong, each of said notches extending at right angles relative to the longitudinal direction.

13. In a longitudinally split sleeve according to claim 10, wherein the reinforcing member exhibits at least one longitudinal fold.

14. In a longitudinally split sleeve according to claim 1, wherein the other edge having the apertures has a longitudinally extending reinforcing element comprising a wire embedded at the edge and said apertures are disposed inward of said wire.

15. In a longitudinally split sleeve according to claim 14, which includes a second wire member extending parallel to the first mentioned wire with the apertures disposed therebetween.

16. In a longitudinally split sleeve according to claim 1, wherein each of the apertures in said other edge are provided with a hollow eyelet.

17. In a longitudinally split sleeve according to claim 1, wherein at least the other edge having the spaced apertures has a bead extending parallel to the edge.

18. In a longitudinally split sleeve according to claim 1, wherein the fold line for each of the radially extending tabs extends at right angles to the edge of the sleeve member.

19. In a longitudinally split sleeve according to claim 1, wherein each of the radial extending closure tabs have a fold line extending at right angles to the edge of the member and have a cut surface extending from said fold line away from said edge to form a hook portion.

20. In a longitudinally split sleeve according to claim 1, wherein the sleeve member adjacent an edge has a flap extending past said edge for covering the joint between the two edges while in the assembled state.

21. In a longitudinally split sleeve according to claim 1, wherein the sleeve member adjacent one of the pair of edges has longitudinally positioned projections disposed adjacent to the closure element forming the closure means to aid in joining said edges together by said closure means.

22. In a longitudinally split sleeve according to claim 21, wherein the projections form a V-shaped groove with the adjacent edge portion, said groove receiving the other edge as the radially extending tabs are disposed in the apertures to join said other edge in a latch condition.

23. In a longitudinally split hose according to claim 21, wherein the projections comprise a single longitudinally extending flap disposed on the interior surface of the sleeve member for overlying said joint when said edges are in the joined position.

24. In a longitudinally split sleeve according to claim 23, wherein said radially extending tabs extend towards said flap and are received in apertures disposed in the other edge which is positioned between said first mentioned edge and flap while in the joined position.

25. In a longitudinally split sleeve according to claim 23, wherein the edge having the internal flap has the plurality of spaced apertures and the radially extending tabs are disposed on the other edge which is received between the flap and the edge adjacent the flap while in the joined position.

26. In a longitudinally split sleeve according to claim 1, wherein each of the radially extending tabs has four portions interconnected by fold lines and consists of a first portion, radially extending from the member, a cross portion extending substantially parallel to said sleeve member, a third portion extending from the cross portion parallel to the first portion and terminating in a latching portion engaged in an adjacent aperture formed by the folding out of the adjacent tab.

27. In a longitudinally split sleeve according to claim 1, wherein said edge having the radially extending tabs as a reinforcing member partially embedded therein, said radially extending tabs being formed in an exposed portion of said reinforcing member and being free of the material of said sleeve.

28. In a longitudinally split sleeve according to claim 1, wherein each of the radially extending tabs extends radially outward from said sleeve member.

29. In a longitudinally split sleeve according to claim 1, wherein each of the radially extending tabs extends radially inward from the sleeve member.

30. In a longitudinally split sleeve according to claim 1, wherein each of the apertures for receiving the radially extending elements is formed in a portion of a reinforcing member.

31. In a longitudinally split sleeve according to claim 1, wherein each reinforcing member has at least a portion embedded in the material of said sleeve member, said reinforcing member being coated with an adhesion promoter.

32. In a longitudinally split sleeve according to claim 1, wherein each of the radially extending tabs after insertion into the aperture on the other edge is bent along its fold line to lock the joint together.

33. In a longitudinally split sleeve according to claim 1, wherein the radially extending tabs are arranged in pairs being folded from the plane in opposite direction from the same fold line and into contact with each other.

34. In a longitudinally split sleeve according to claim 33, which includes a retaining element for holding the pairs of tabs together.

35. In a longitudinally split sleeve according to claim 1, wherein each of the edge portions of the sleeve member have a curved transverse cross-sectional configuration, and one of said edge portions has a flap extending from adjacent thereof having a curved configuration for sealing the joint between the edges.

36. In a longitudinally split sleeve according to claim 1, wherein the thickness of the sleeve member at a portion surrounding the object and the thickness of the sleeve member adjacent each edge are different.

37. In a longitudinally split sleeve according to claim 1, wherein a sealing material such as melting adhesive is provided in a sealing area adjacent the joint between said edges.

38. In a longitudinally split sleeve according to claim 1 wherein the object being enclosed is a cable.

* * * * *